Figure 4:
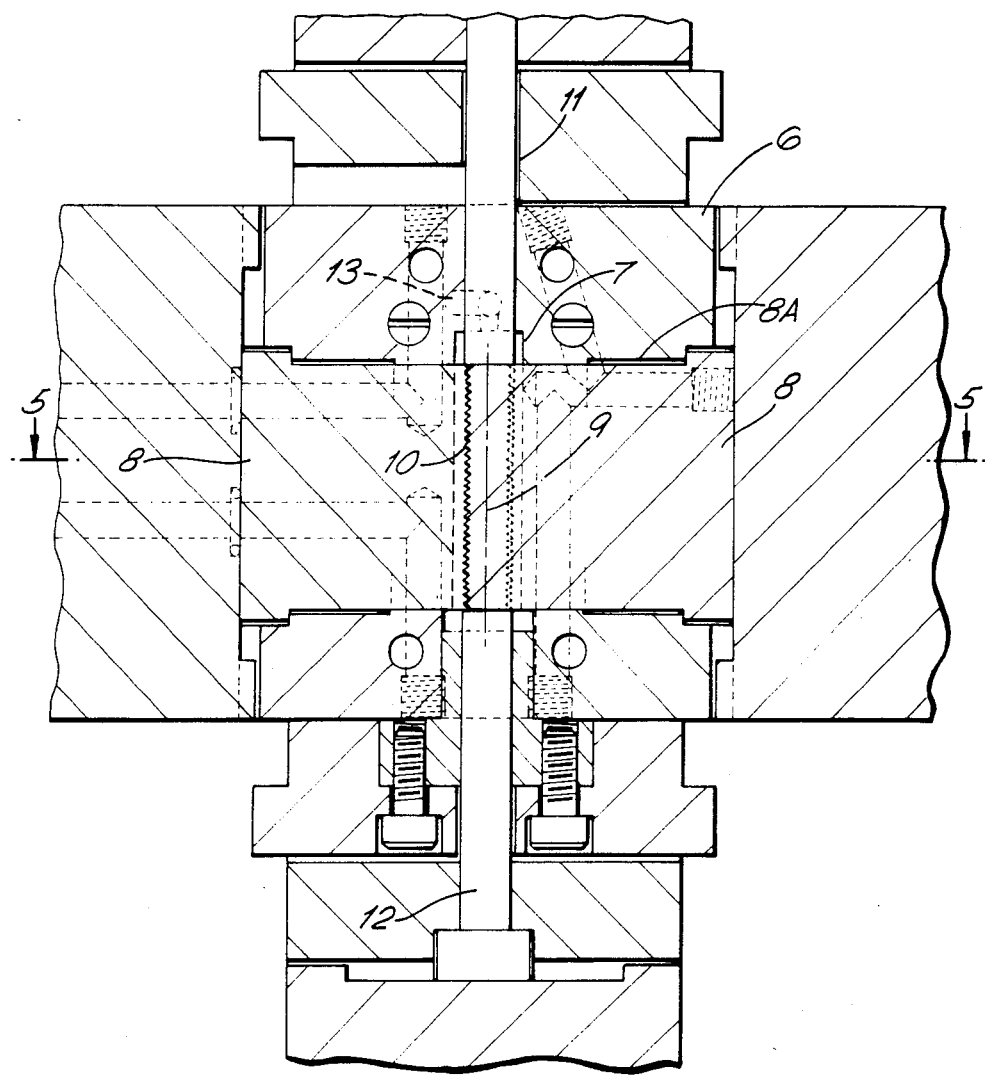

United States Patent [19]

Wright

[11] Patent Number: 4,554,962

[45] Date of Patent: Nov. 26, 1985

[54] METHOD AND APPARATUS FOR FORMING AN INTERNALLY SCREW-THREADED ARTICLE

[75] Inventor: David E. Wright, Evesham, England

[73] Assignee: Dynacast International Limited, Alcester, England

[21] Appl. No.: 639,393

[22] Filed: Aug. 10, 1984

[30] Foreign Application Priority Data

Aug. 20, 1983 [GB] United Kingdom ............... 8322468

[51] Int. Cl.$^4$ ............................................. B22D 29/00
[52] U.S. Cl. ..................................... 164/132; 164/137; 164/340; 164/342; 164/346; 249/59
[58] Field of Search ..................... 164/339–343, 164/132, 137, 345, 346; 249/59

[56] References Cited

U.S. PATENT DOCUMENTS 3,057,014 10/1962 Kirch ................................... 249/59
3,528,637 9/1970 Bedford .............................. 164/132
4,079,475 3/1978 Thompson ......................... 164/131
4,090,687 5/1978 Langhammer et al. ............ 164/346

Primary Examiner—Nicholas P. Godici
Assistant Examiner—Samuel M. Heinrich
Attorney, Agent, or Firm—Larson and Taylor

[57] ABSTRACT

A method of casting or moulding an internally screw-threaded article comprises introducing casting or moulding material around two withdrawable flat core members which overlap within a mould cavity. The leading end face of each core member is formed with a male segment of the female screw thread to be formed in the article, the arrangement being that when the core members meet one another the two screw thead segments of the two core members are located to form two diametrally opposite segments of a male image of said female screw thread, withdrawing the core members from the mould cavity when the casting or moulding material has set and removing the cast article from the mould cavity.

8 Claims, 5 Drawing Figures

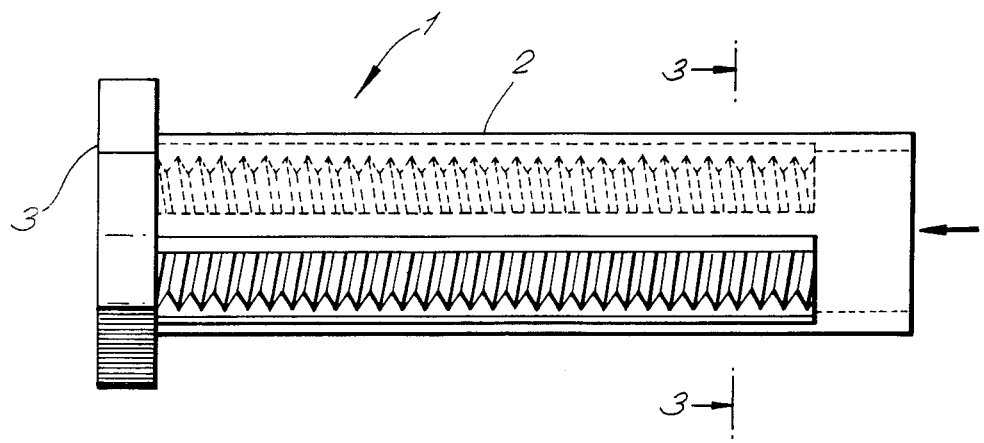
Fig. 1.
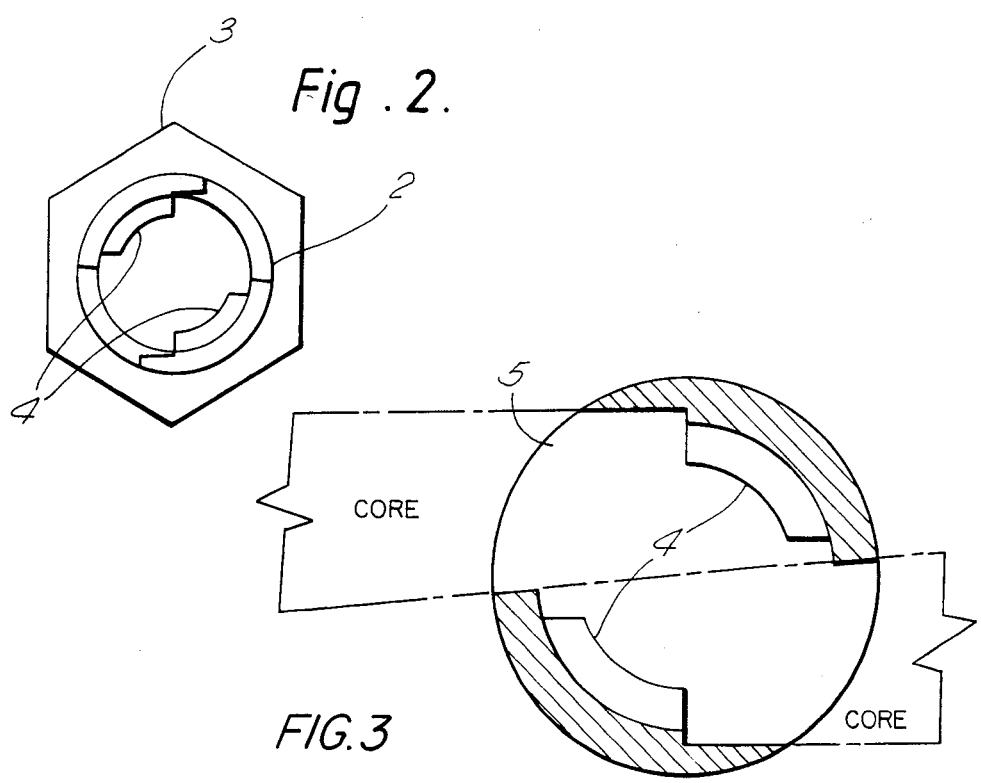
Fig. 2.
FIG. 3

METHOD AND APPARATUS FOR FORMING AN INTERNALLY SCREW-THREADED ARTICLE

The subject of this invention is a method of forming by casting or moulding an internally screw-threaded article.

In the usual method of forming an internally screw-threaded article by casting or moulding it is necessary to employ a core formed with a mirror image of the screw thread. To remove the core it is normally necessary to unscrew the core all the way out of the formed article. This process is time consuming and adds considerable complication to the die casting machinery. Certainly in forming some articles of plastics material employing a coarse thread of short length it is possible to pull the core out, simply causing the material of the moulding to spring outwardly over the screw thread on the core. This is quite impossible with an article cast or moulded in a rigid material, for example in metal.

In consequence great savings in time could be effected by casting or moulding the article in such a way that the core forming the internal screw thread did not require to be unscrewed from the formed article and it is an object of the present invention to provide a method of and apparatus for forming such an article. It is also an object of the invention to provide an internally screw-threaded tubular article having improved characteristics over such articles as already known.

An example of the kind of article to which the invention is particularly applicable is a metallic socket to be used for attaching a trophy to a wooden base, the socket being inserted into a hole formed on the underside of the wooden base and a screw-threaded pin fitted through the trophy down into the screw-threaded interior of the socket. This is, of course, only one example of the use of such an article but the method and apparatus are, of course, applicable to many different forms of internally screw-threaded articles.

According to the invention a method of casting or moulding an article having an internally screw-threaded hole in a mould cavity which is shaped to define the exterior contour of the article is characterized by introducing casting or moulding material into the mould cavity around two withdrawable flat core members which have a width which, measured in the same direction as the axis of the screw-threaded hole to be formed, is less than the dimension of the cavity in the said direction and which project towards one another into the cavity and meet in a transversely offset, partially overlapping relationship, each said core member having a leading end face formed to present a segment of a screw thread which is a male image of a segment of the female internal screw thread to be formed in the article so that the two segments of screw thread form two diametrally opposite segments of a male image of the female internal screw thread to be formed in the article, withdrawing the core members from the mould cavity when the casting or moulding material has set and removing the article from the mould cavity.

Apparatus for forming by casting or moulding an article having an internally screw-threaded hole including a mould body formed with a cavity shaped to define the exterior contour of the article to be formed is characterized in that the mould body incorporates two flat transversely offset core members which have a width, which in a direction parallel to the axis of the screw-threaded hole in the article to be formed, is less than the dimension of the mould cavity in the said direction and meet and partially overlap one another within the cavity, the leading end face of each of said core members being formed with a male image of a segment of the female internal screw thread to be formed within the article, the arrangement being such that the screw threads on the leading ends of the meeting and overlapping core members form two diametrally opposite segments of a male image of the female internal screw thread to be formed in the article and the mould body is formed with at least one passage for introduction into the mould cavity of casting or moulding material.

The mould body may be formed with two slots extending from opposite sides of the cavity to the outside of the mould body, the slots being substantially parallel and offset transversely from one another and having a width which, in a direction parallel to the axis of the screw-threaded hole in the article to be formed, is less than the dimension of the mould cavity in the said direction, and the two flat core members fit and are movable in the offset slots between an inoperative position where they are completely withdrawn from the cavity and the position where they meet and partially overlap one another within the cavity.

The mould may be formed of two separable portions, each portion supporting permanently fixed thereto a core member projecting into the portion of the mould cavity presented by that mould portion, the arrangement being such that when the mould portions are brought together to close the mould cavity the core members meet and partially overlap one another within the mould cavity.

The mould body may be formed at at least one end of the cavity with a passage of circular cross section within which a core pin is a sliding fit, said passage being coaxial with the axis of the screw thread to be formed in the article and of a diameter at least equal to the root diameter of the female screw thread to be formed in the article.

The slots may be so located that the core members are spaced from both ends of the cavity when they meet within the cavity. Alternatively, the slots may be so located that one side face of each of the two core members is in line with one end of the cavity.

The surface of the two core members arranged to meet one another in overlapping relation may be inclined with respect to the direction of movement of the core members in the slots so that by wedge action the core members are pressed together as they are advanced to meet one another.

The mould body may be formed with a number of cavities each having its own pair of flat core members. In such a construction the cavities may be interconnected so that casting or moulding material can be injected simultaneously into all the cavities.

The mould body may be formed to receive rod-like core pins inserted axially from both ends, said core pins being arranged to abut against the side faces of the flat core members when the flat core members are in contact with one another.

Figure 5:
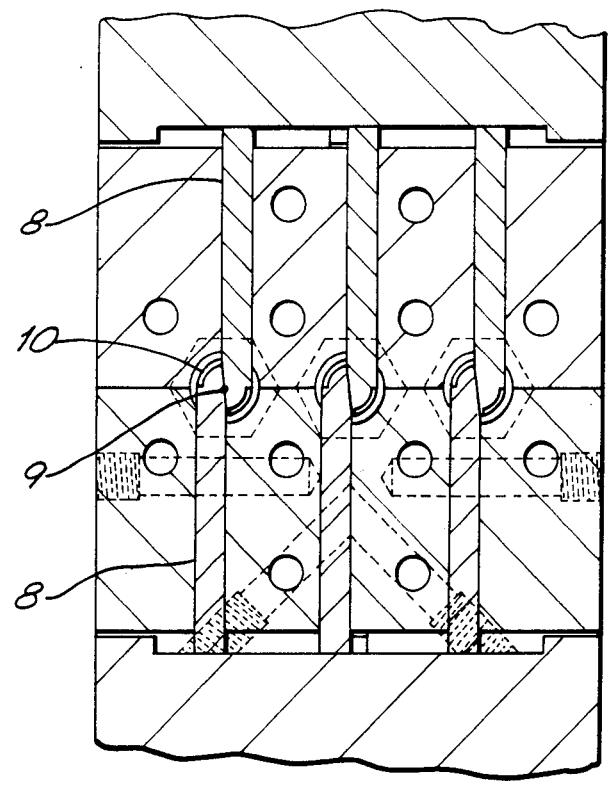

A practical embodiment of the invention is illustrated in the accompanying drawings in which FIG. 1 is a side view of an internally screw-threaded tubular article formed by the process and apparatus of the invention, FIG. 2 is a view looking in the direction of the arrow in FIG. 1, FIG. 3 is a section to an enlarged scale through the line 3—3 in FIG. 1 and FIG. 4 is a section through the apparatus showing the flat core members in one cavity and FIG. 5 is a section through the line 5—5 in FIG. 4.

In the drawings and referring particularly to FIGS. 1, 2 and 3, 1 denotes an internally screw-threaded metallic socket suitable for use in attaching an object such as a trophy to a wooden base. The article 1 has a cylindrical portion 2 and a hexagonal head 3 formed on one end thereof. 4 denotes diametrally opposite segments of a screw thread which co-operate to form part of a screw-threaded bore in the article able to receive a screw-threaded pin or fixing screw inserted from one end. The body 2 has two longitudinal slots 5 which have been formed as will be described later in the specification.

Referring now to FIGS. 4 and 5, 6 denotes a mould formed with a cavity 7 shaped to form the exterior contour of the article to be formed therein. 8 denotes flat core members having a width (between their side faces 8A) in the direction of the line 9, which is the axis of the screw-threaded hole to be formed in an article cast in the cavity 7, less than the length of the cavity 7 in the direction of the line 9 and offset transversely from one another with respect to the line 9 as is seen clearly in FIG. 5. The core members 8 in their final forward position in the mould 6 meet and overlap one another as can again be seen clearly in FIG. 5. The leading end face 10 of each member 8 is formed with the male image of the segment 4 of the female screw thread to be formed in the article. When the two core members are in mating relationship as indicated in FIG. 5 the two diametrally opposite segments 10 are in position to form a male image of the two diametrally opposite segments 4 of the screw thread to be formed in the article. 11 denotes a core pin inserted from one end of the mould body 6 and 12 denotes a second core pin inserted from the opposite end of the mould body 6, the core pins 11 and 12 being coaxial with one another and with the screw thread to be formed in an article to be cast in the mould body 6. At least one of the core pins has a diameter at least equal to the root diameter of the internal screw thread to be formed in the article. In the illustrated construction the core pins come against the side faces 8A of the core members 8 to provide a continuous hole through the article to be cast in the body 6. This construction provides an article with a screw-threaded hole terminating in two plain portions at both ends. It is to be understood that there may be occasions when it is desired to form an article in which the screw-threaded hole is to be screw-threaded all the way up to one end of the article. For this form of article one end face 8A of opposite core members will be in line with the end face of the cavity 7 and there will be no necessity for a core pin at that end. In a further variation such a pin may not require to have a plain portion at the other end i.e. the screw-threaded hole will have a blind end. In this further construction there is no necessity for a core pin at the other end either so that the apparatus would comprise simply the core body 6 formed with a cavity 7 and with flat core members 8 arranged to project into the cavity 7, one side face of each core member being in line with the same end of the core cavity 7. 13 denotes passageways for the introduction of casting material.

In practice, the core body 6 is closed to form the cavity 7 at the same time bringing the flat core members into mating overlapping contact with one another and the core pins 11 and 12 are located in the ends of the core body 6. Casting material is then injected through the passageways 13 to fill the cavity 7, the internal screw-threaded hole being formed by the mirror image screw threads on the leading ends of the core members 8. When the casting material has solidified the mould body 6 is opened. This has the effect of withdrawing the core members 8 from the cast article. Because each core member has formed only a segment of screw thread without undercut the core member can be withdrawn without difficulty leaving a segment of the thread in the article, the core members being withdrawn through the slots 5 which have been formed in the side walls of the article by the rear portions of the core members 8. At the same time the pins 11 and 12 are retracted leaving the article as illustrated in FIGS. 1, 2 and 3. The two segments 4 of a screw thread are quite sufficient for engagement with a screw-threaded pin or other screw-threaded fixing device.

In the construction where the core members are in line with one end of the cavity 7 the article will be bifurcated so that it presents two legs unconnected at one end with the screw thread continuing to that end. Where no core pin is provided at the other end the screw-threaded hole will terminate before that other end.

The method and apparatus of the invention can be used to produce cast or moulded articles of many shapes, the feature produced by the invention being the screw-threaded hole. The body of the article need not be cylindrical, for example, it may be hexagonal or other polygonal shape. The method and apparatus can be used to form, for example, the centre member of a turnbuckle by forming the leading end of each core member with two sections of mirror image screw thread, one section of right hand pitch and the other section of left hand pitch. The diametrally opposite slots formed by the core members in the body present the opening normally provided in the body of a turnbuckle for the insertion of a tommy bar.

An article formed by the process of the invention has the advantages of providing adequate grip for a screw-threaded pin while saving the material which would otherwise fill the slots. The article is lighter for this reason also. The presence of the slots also makes it easy to observe how far a screw-threaded object is screwed into the article.

What I claim is:

1. A method of casting or moulding an article having an internally screw-threaded hole in a mould cavity which is shaped to define the exterior contour of the article comprising introducing casting or moulding material into the mould cavity around a thread forming core consisting of two withdrawable flat core members which have a width which, measured in the same direction as the axis of the screw-threaded hole to be formed, is less than the dimension of the cavity in the said direction and which project towards one another into the cavity and meet in a transversely offset partially overlapping relationship, each said core member having a leading end face formed to present a segment of a screw thread which is a male image of a segment of the female internal screw thread to be formed in the article so that the two segments of screw thread form two diametrally opposite segments of a male image of the female internal screw thread to be formed in the article, withdrawing the core members from the mould cavity when the casting or moulding material has set and removing the article from the mould cavity.

2. Apparatus for forming by casting or moulding an article having an internally screw-threaded hole including a mould body formed with a cavity shaped to define the exterior contour of the article to be formed in which the mould body incorporates a thread forming core consisting of two flat transversely offset core members which have a width which, measured in a direction parallel to the axis of the screw-threaded hole in the article to be formed, is less than the dimension of the mould cavity in the said direction and meet and partially overlap one another within the cavity, the leading end face of each of said core members being formed with a male image of a segment of the female internal screw thread to be formed within the article, the arrangement being such that the screw threads on the leading ends of the meeting and overlapping core members form two diametrically opposite segments of a male image of the female internal screw thread to be formed in the article and the mould body is formed with at least one passage for introduction into the mould cavity of casting or moulding material.

3. Apparatus as claimed in claim 2, in which the mould body is formed with two slots extending from opposite sides of the cavity to the outside of the mould body the slots being substantially parallel and offset transversely from one another and having a width which, measured in a direction parallel to the axis of the screw-threaded hole in the article to be formed, is less than the dimension of the mould cavity in the said direction, and the two flat core members fit and are movable in the offset slots between an inoperative position where they are completely withdrawn from the cavity and the position where they meet and partially overlap one another within the cavity.

4. Apparatus as claimed in claim 2, in which the mould body is formed of two separable portions, each portion supporting permanently fixed thereto one of said core members projecting into the portion of the mould cavity presented by that mould portion, the arrangement being such that when the mould portions are brought together to close the mould cavity the core members meet and partially overlap one another within the mould cavity.

5. Apparatus as claimed in claim 2, in which the mould body is formed at least one end of the cavity with a passage of circular cross section coaxial with the axis of the screw thread to be formed in the article and of a diameter at least equal to the root diameter of the female screw thread to be formed in the article and a core pin which is a sliding fit in the passage is movable through the passage part way into the cavity.

6. Apparatus as claimed in claim 3, in which the slots are so located that the core members are spaced from both ends of the cavity when they meet within the cavity.

7. Apparatus as claimed in claim 3, in which the slots are so located that one side face of each of the two core members is in line with one end of the cavity.

8. Apparatus as claimed in claim 3, in which the surfaces of the two core members which meet one another when the core members overlap are inclined with respect to the direction of movement of the core members in the slots.

* * * * *